(12) United States Patent
Charych

(10) Patent No.: US 6,760,238 B2
(45) Date of Patent: Jul. 6, 2004

(54) APPARATUS AND METHOD FOR DC/DC CONVERTER HAVING HIGH SPEED AND ACCURACY

(75) Inventor: Arthur Charych, Setauket, NY (US)

(73) Assignee: BC Systems, Inc, Setauket, NY (US)

( * ) Notice: Subject to any disclaimer, the term of this patent is extended or adjusted under 35 U.S.C. 154(b) by 0 days.

(21) Appl. No.: 10/279,604

(22) Filed: Oct. 24, 2002

(65) Prior Publication Data

US 2004/0080962 A1 Apr. 29, 2004

(51) Int. Cl.[7] .............................................. H02M 3/24
(52) U.S. Cl. ..................... 363/97; 363/21.11; 363/21.18
(58) Field of Search ........................... 363/21.05, 21.1, 363/21.11, 21.13, 21.18, 97, 131; 322/282, 283, 284

(56) References Cited

U.S. PATENT DOCUMENTS

| | | | |
|---|---|---|---|
| 5,260,861 A | 11/1993 | Wert | 363/25 |
| 5,770,940 A * | 6/1998 | Goder | 323/282 |
| 5,912,552 A | 6/1999 | Tateishi | 323/285 |
| 6,169,680 B1 | 1/2001 | Matsui et al. | 363/97 |
| 6,288,524 B1 * | 9/2001 | Tsujimoto | 323/285 |
| 6,304,066 B1 | 10/2001 | Wilcox et al. | 323/282 |
| 6,396,725 B1 | 5/2002 | Jacobs et al. | 363/131 |
| 6,434,025 B2 | 8/2002 | Shirai et al. | 363/21.1 |

* cited by examiner

*Primary Examiner*—Michael Sherry
*Assistant Examiner*—Gary L. Laxton
(74) *Attorney, Agent, or Firm*—Brown & Michaels, PC

(57) ABSTRACT

A system and method for DC/DC conversion are provided in which a high accuracy digital pulse width modulator controller circuit controls a power switch to obtain a desired DC output. The control circuit amplifies the difference of a DC output sample in relation to voltage reference. The amplified difference is then compared with a portion of the DC output. The compared result is used for controlling the power switch. A ripple coming from the DC output side is overlaid upon either one of the inputs to the comparator depending upon the polarity of the ripple signal.

17 Claims, 13 Drawing Sheets

Transient response = 7 clock cycles

APPARATUS AND METHOD FOR DC/DC CONVERTER HAVING HIGH SPEED AND ACCURACY

BACKGROUND OF THE INVENTION

1. Field of the Invention

The invention pertains to the field of electric circuits. More particularly, the invention pertains to apparatus and method for DC/DC converters having high speed and high accuracy. Yet more particularly, this invention pertains to the control of the output voltage of DC/DC converters.

2. Description of Related Art

DC/DC converters are known to be used in various industries. The usage includes power supplies for computers, personal digital assistants, cellular phones and other hand held mobile electronic devices and systems. Each usage may have specific demands. Further, DC/DC converters have various types of output voltage control which utilizes pulse width modulation (PWM) type. In general, PWM type DC/DC converters can be subdivided into analog pulse width modulation control and digital pulse width modulation control.

Analog Pulse Width Modulation Control

Analog pulse width modulation control is by far the most prevalent method for controlling DC/DC Converters. A block diagram of a DC/DC converter with this type of control is shown in FIG. 1. The control circuit blocks, which comprise the conventional analog pulse width modulation control circuit, are shown within the dotted section of FIG. 1. The remainder of the circuitry of FIG. 1 provides the actual DC/DC conversion function.

FIG. 1 shows a transformer isolated forward converter topology for the DC/DC converter function. The same type of control circuit, however, is used for non-isolated forward converter topology, isolated and non-isolated flyback, push pull, half bridge, full bridge, Sepic, Cuk, Weinberg, Severns, and other topologies. Although we will limit our discussion to the Isolated Forward Converter topology of FIG. 1, it should be understood that any other DC/DC converter topologies are controlled in the same manner.

The conventional analog control method regulates the DC Output voltage of a DC/DC converter by varying the ratio of the "on" time and "off" time of the DC/DC Converters power switch Q1. Control of the DC output voltage starts by using an error amplifier (U2) for comparing a sample of the output voltage to a voltage reference. The error amplifier outputs a voltage, which is proportional to the difference between a sample of the DC output and the voltage reference. Since the error amplifier has a very high DC gain (usually more than 10,000), a very small DC output error (less than 1 millivolt) will produce a very large change in error amplifier output voltage. The output of the error amplifier connects to the pulse width modulator circuitry comprised of a comparator U3, ramp generator U4, latch U5, and clock generator U6.

Waveforms associated with the pulse width modulation function are shown in FIG. 2. The pulse starts when the clock generator turns on the latch. This turns on Power switch Q1 through switch driver U1, and starts the flow of power through transformer T1, rectifier CR1, and output filter L1 and C1.

The clock generator also starts a ramp (shown in FIG. 2), which connects to one side of the comparator U3. The other leg of the comparator connects to the output of the error amplifier U2. The comparator U3 changes state and turns off the latch U5 when the ramp generator U4 output becomes the same as the error amplifier output, which in turn shuts off transistor Q1. The process repeats when the clock generator U6 turns on the latch U5 again.

The pulse width generated by the above control circuit depends on the output of the error amplifier U2. If the DC output is too low, the error amplifier output increases, thereby increasing the pulse width driving transistor switch Q1, which increases the DC output. Conversely, if the DC output is too high, the error amplifier voltage decreases, thereby decreasing the pulse width driving transistor switch Q1, and decreasing the DC output. The DC output is thus accurately regulated by the action of the error amplifier U2.

The DC output not only needs to be accurately regulated, it also needs to be stable. DC outputs are known to possess an AC ripple component. Stability means that the DC output has an AC ripple component at the same frequency as the clock generator U6. In order for this to occur, for a fixed DC input voltage and for a fixed DC output load, the pulse width driving power switch Q1 must not change from pulse to pulse,. This is shown in FIG. 2 as a constant error amplifier output, which generates the same pulse width among the three pulses that are depicted. It is pointed out that those skilled in the state of the art should know how to choose stabilization components R1, C2, C4, R3, and C3 so as to stabilize the DC output for a given clock generator frequency and output filter components L1 and C1.

Also of importance in DC output stabilization is the choice of ramp renerator U4. If the ramp is fixed and unchanging, it is called voltage mode control. On the other hand, if the ramp is derived from the inductor current L1, it is called current mode control. The choice of stabilization components is different for these two types of ramp generators.

Analog PWM control methods for DC/DC converter have their drawbacks. One of them is the byproducts of stabilizing the DC output in that the error amplifier is slowed down. The DC output, therefore, is limited by the speed with which it can respond to a change in DC input voltage or DC output load current.

FIG. 3A shows a typical response of the DC output voltage to a change in DC output load current. As the DC output load steps from one value to a higher value, the DC output voltage at first drops. The error amplifier eventually responds and corrects for this drop. Likewise, as shown in FIG. 3B, when the DC output load current steps from a higher value to a lower value, the DC output voltage first goes up, before the error amplifier responds and corrects for this increase. The speed with which the DC Output voltage corrects is called the transient response. The transient response is a complex combination of clock generator frequency, choice of output filter components, and choice of stabilization components. As a general rule, however, a well-stabilized DC/DC converter output cannot respond any faster than 50 to 100 clock generator cycles. This then is the limiting factor in the speed in which an analog pulse width modulated DC/DC converter can respond to changes in DC Input voltage or changes in DC output load current.

Digital Pulse Width Modulation Control

By digital pulse width modulation control, it is generally referred to the utilization of a voltage comparator without an error amplifier for the DC output voltage control of a DC/DC converter. Digital regulation started in the early days of transistor DC/DC switching regulators, going back to the 1970's. These regulators were called ripple regulators. A single comparator turned the transistor switch on and off based on the DC output voltage ripple. There was no clock generator or latch. The delays through the various circuit components determined the frequency of the regulators' operation.

The technique became more sophisticated, and resulted in a patent being granted in 1993 to Harry E. Wert (see U.S. Pat. No. 5,260,861). An equivalent block diagram of the DC output voltage control portion of the Wert patent is shown in FIG. 4. Ac can be seen, the control of the DC output voltage starts by comparing a sample of the DC output voltage to a voltage reference by a voltage comparator, U2.

Waveforms associated with the pulse width modulation function are shown in FIG. 5. The pulse starts when the clock generator U4 turns on the latch U3. This turns on Power switch Q1 through switch driver U1, and starts the flow of power through transformer T1, rectifier CR1, and output filter L1 and C1.

The comparator U2 changes state and turns off the latch U3 when the sampled DC output becomes the same as the Voltage reference U5, which in turn shuts off transistor Q1. The process repeats when the clock generator turns on the latch again.

The pulse width generated by the above circuit depends on the DC output (Vout). If the DC output is too low, the comparator output stays in a high state longer, increasing the pulse width driving transistor switch Q1, which increases the DC output. Conversely, if the DC output is too high, the comparator output stays high for a shorter period of time, thereby decreasing the pulse width driving transistor switch Q1, and decreasing the DC output. The DC output is thus regulated by the action of the voltage comparator U2.

As with the previous discussion of analog pulse width modulation, the digital pulse width modulation control also needs to be stable. Stability means that the DC output has an AC ripple component at the same frequency as the clock generator. In order for this to occur, for a fixed DC input voltage and a fixed DC output load, the pulse width driving power switch Q1 must not change from pulse to pulse. This is shown in FIG. 5 as a constant ripple component of the DC output sample (Vout), which generates the same pulse width among the three pulses shown.

It is pointed out that in order for the DC output to be stable, the ripple component of the DC output sample must have a large enough slope to act as the Ramp generator acts in the analog pulse width modulation method. This is one of the drawbacks of the digital control method since the DC output ripple must be much higher than that of the analog control, and the ripple amplitude must be accurately controlled. Controlling the amplitude of the ripple is difficult because it is a function of a parameter of capacitor C1 called the Equivalent Series Resistance, or ESR. The ESR of capacitors varies widely from unit to unit, thereby causing difficulty in maintaining a stable DC output in a production environment. The difficulty in maintaining stable DC output is one of the reasons why the digital control method is generally not used for the control of high performance DC/DC Converters.

Because of its simplicity, however, the digital control method is used for the control of low performance, low cost DC/DC converters. For these applications, instability, which causes a low frequency component to show up in the DC output, and thus requires a much larger output filter to be used, may not matter much. Oscilloscope photographs of a DC output with this type of low frequency instability are shown in FIGS. 6A and 6B.

The digital control method suffers from a second drawback in that the output voltage is not regulated as accurately as with the analog control method. This is because there is no high gain error amplifier, which produces a large voltage change due to a very small error in DC output. This phenomenon can be inferred from the Digital Pulse Width Modulator waveforms of FIG. 5. As can be seen, during the latch output "on" time, the sampled DC output ($V_{out}$) ramps up until it touches the Voltage Reference ($V_{ref}$), at which point the latch output turns off and the sampled DC output begins to ramp down. If the DC Input voltage or the load output current change in such a way that a much smaller pulse width is needed to maintain output voltage regulation as shown in the last 3 pulses of FIG. 5, the ramp-up portion of the DC output becomes smaller and the ramp-down portion becomes larger. This forces the average sampled DC output voltage to rise, thereby causing the DC output voltage to increase. Likewise, if a larger pulse width is needed due to a change in DC Input voltage or output load current, the ramp-up portion of the sampled DC output voltage becomes larger, while the ramp-down portion becomes smaller. This causes the DC output voltage to drop.

This less than perfect regulation of the DC output voltage may be of little consequence for low performance, low cost DC/DC converter applications. For high performance DC/DC converters, however, a much tighter output voltage regulation is generally required.

One advantage of digital control method is the speed with which it reacts to changes in DC Input voltage or changes in output load current. While the analog control method requires 50 to 100 clock cycles to react to a transient condition, the digital control method typically merely requires 10 clock cycles or less.

FIG. 7 shows a typical response of the DC Output voltage utilizing digital control, to a change in DC output load current. As the DC output load steps from one value to a higher value, the DC output voltage drops. The comparator corrects for this drop but not completely. As can be seen, there is a difference between the output voltage prior to the load change, and after the load change. The speed with which the DC Output voltage corrects, i.e. the transient response, is measured to be approximately 5 to 10 clock cycles.

To summarize the above discussion, the plusses and minuses of the analog control method are as follows. The plusses are: most prevalent and most well understood (a plus); generates a highly accurate DC output voltage (a plus); well-understood stabilization procedures to those skilled in the art, (a plus); and low output voltage ripple (plus).

However, one of the significant drawbacks of the analog control method is that the method is slow to respond to changes in DC input voltage or to changes in output load. The response typically requires 50 to 100 clock cycles (a significant minus).

On the other hand, the plusses and minuses of the digital control method are as follows. The plusses for digital method includes low cost on an unit basis, and simple to implement, as well as very fast response to changes in DC input voltage or output load (plusses).

However, digital control method has a number of minuses. The minuses include low performance levels, having stabilization dependent on parameters that cannot be well controlled (a minus); high output ripple being required in order to maintain stability (a minus); and DC output voltage being not very accurately controlled (a minus).

As can be appreciated, although prior art conventional analog pulse width modulation control methods for DC/DC Converters provide for a high accuracy output voltage regulation having low output voltage ripple, but the methods are slow to respond to changes in load current or input voltage. On the other hand, prior art conventional digital control pulse width modulation control methods provide for high-speed response to changes in output load current or input voltage, but this provision is achieved at the expense of poor accuracy in output voltage regulation, and in higher output voltage ripple.

Therefore, it is desirous to have a circuit and method which blends the digital and analog control methods of DC/DC converters so as to obtain a DC/DC Converter which possesses the speed of the digital control method and the output voltage accuracy and low output voltage ripple content of the analog control method.

SUMMARY OF THE INVENTION

A digital control circuit is provided as part of a DC/DC converter to generate a highly accurate output such as a DC output.

A digital control circuit is provided as part of a DC/DC converter to generate a highly accurate DC output with low output voltage ripple.

As part of a DC/DC converter system and method, a digital control circuit that is fast in responding to changes in DC input voltage is provided.

As part of a DC/DC converter system and method, a digital control circuit that is fast in responding to changes in output load is provided.

As part of a DC/DC converter system and method, a digital control circuit that can be implemented at low cost is provided.

As part of a DC/DC converter system and method, a digital control circuit that can be better controlled than prior art circuits is provided.

As part of a DC/DC converter system and method, a digital control circuit that can be stabilized independent of parameters that cannot be well controlled.

A DC/DC converter system and method that does not require high output voltage ripple to maintain stability are provided.

A DC/DC converter system and method that accurately controls DC output voltage are provided.

A DC/DC converter system and method that possesses fast response to changes in DC input voltage is provided A DC/DC converter system and method that possesses fast response to changes in output load is provided.

Accordingly, a digital pulse width modulator (PWM) control circuit which is coupled to the DC output is provided. The circuit includes a first input being a sample of the DC output; a second input being coupled to the DC output and possessing a ripple signal in synchronization with a DC output component; a voltage reference for determining a desired DC output; an adjustment amplifier having a portion of the DC output and the voltage reference as inputs, thereby amplifying a first difference; and a comparator having the first input and the output of the adjustment amplifier as inputs thereto with the second input overlaying one of the comparator inputs, the comparator comparing a second difference. Thereby a determination is made as to whether the DC output is above or below the desired DC output and a correction is performed to change the DC output to a set of values as close to the desired DC output as possible.

Accordingly, a DC/DC converting system is provided that includes a DC input power source disposed to be switched on and off periodically by a first power switch; and at least one DC output receiving power from the DC input power source. The system further includes at least one digital pulse width modulator (PWM) control circuit which is coupled to the DC output. The circuit includes a first input being a sample of the DC output; a second input being coupled to the DC output and possessing a ripple signal in synchronization with a DC output component; a voltage reference for determining a desired DC output; an adjustment amplifier having a portion of the DC output and the voltage reference as inputs, thereby amplifying a first difference; and a comparator having the first input and the output of the adjustment amplifier as inputs thereto with the second input overlaying one of the comparator inputs, the comparator comparing a second difference. Thereby a determination is made as to whether the DC output is above or below the desired DC output and a correction is performed to change the DC output to a set of values as close to the desired DC output as possible.

Accordingly, a method for controlling a DC/DC converter is provided. The method includes the steps of providing a switchable DC input to generate at least one DC output; providing a voltage reference; amplifying a first difference between a portion of the DC output and the voltage reference; and comparing a second difference between a portion of the DC output and the amplified first difference.

DETAILED DESCRIPTION OF THE INVENTION

Figure 8:
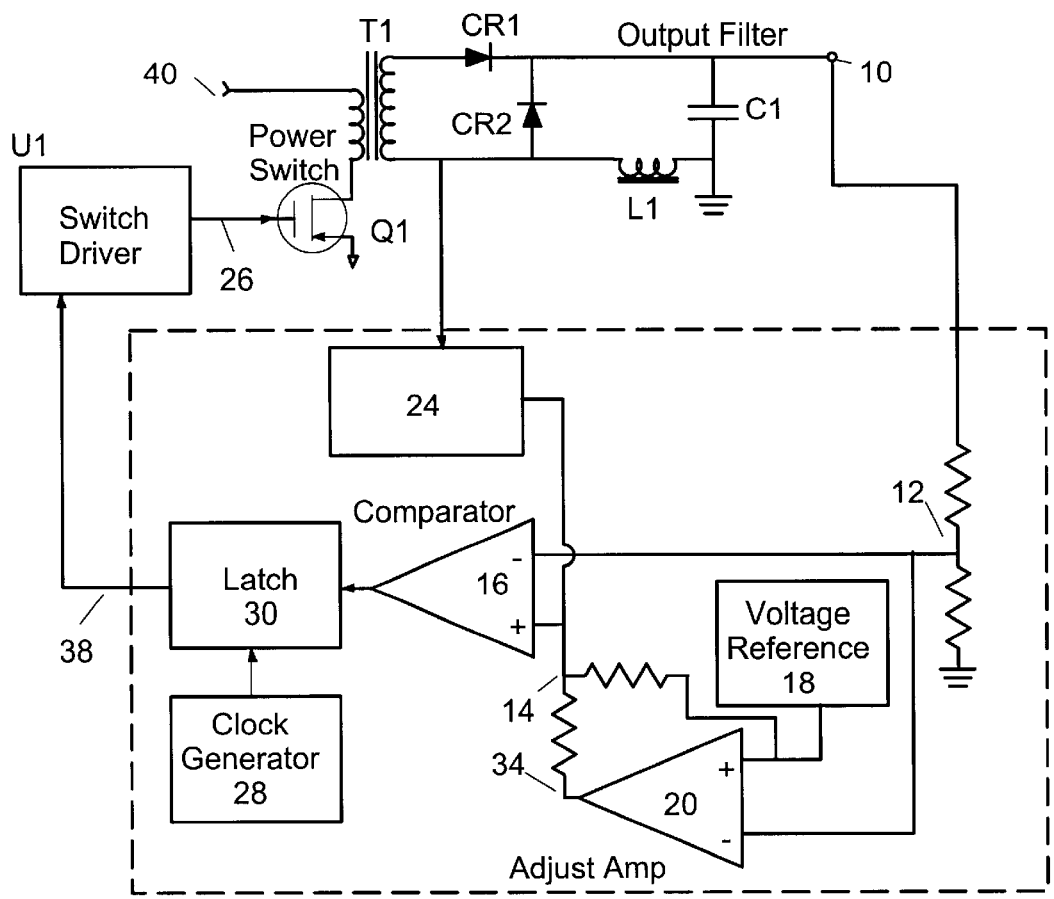
FIG. 8 shows an embodiment of the present invention depicting a high accuracy digital pulse width modulation control circuit and method for DC/DC converters.
Figure 9A:
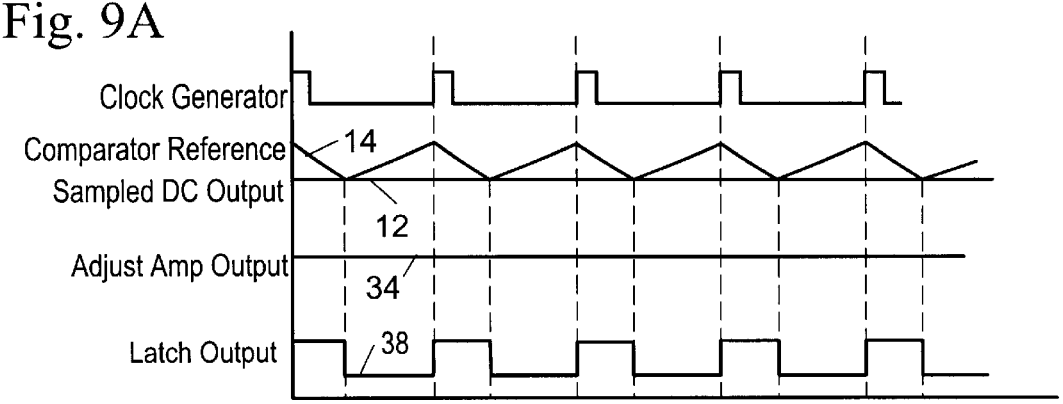
FIG. 9 shows a set of waveforms of FIG. 8 depicting the embodiment.
Figure 9B:
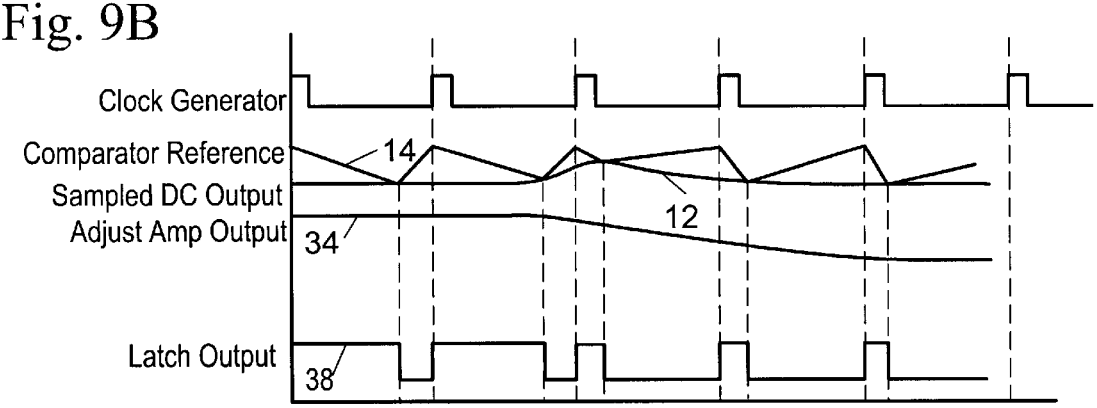
Figure 9C:
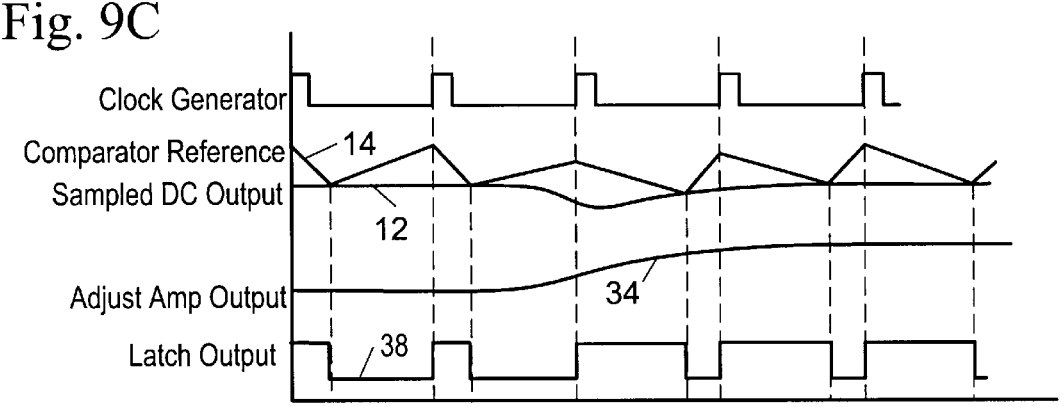
Figure 9D:
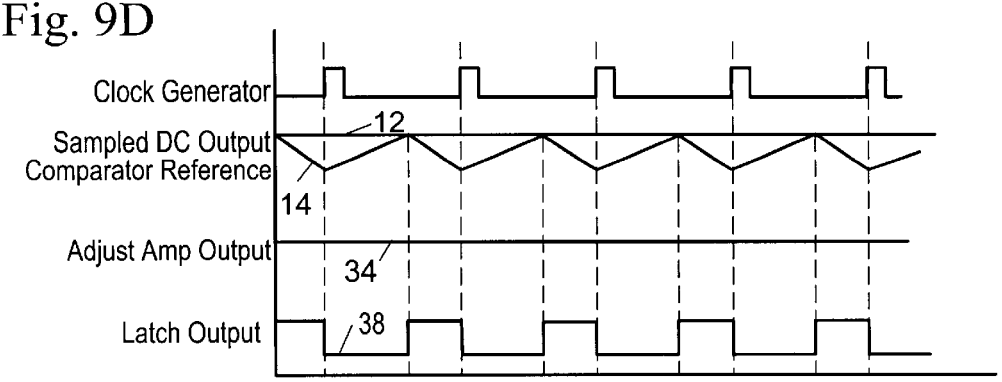
Figure 10:
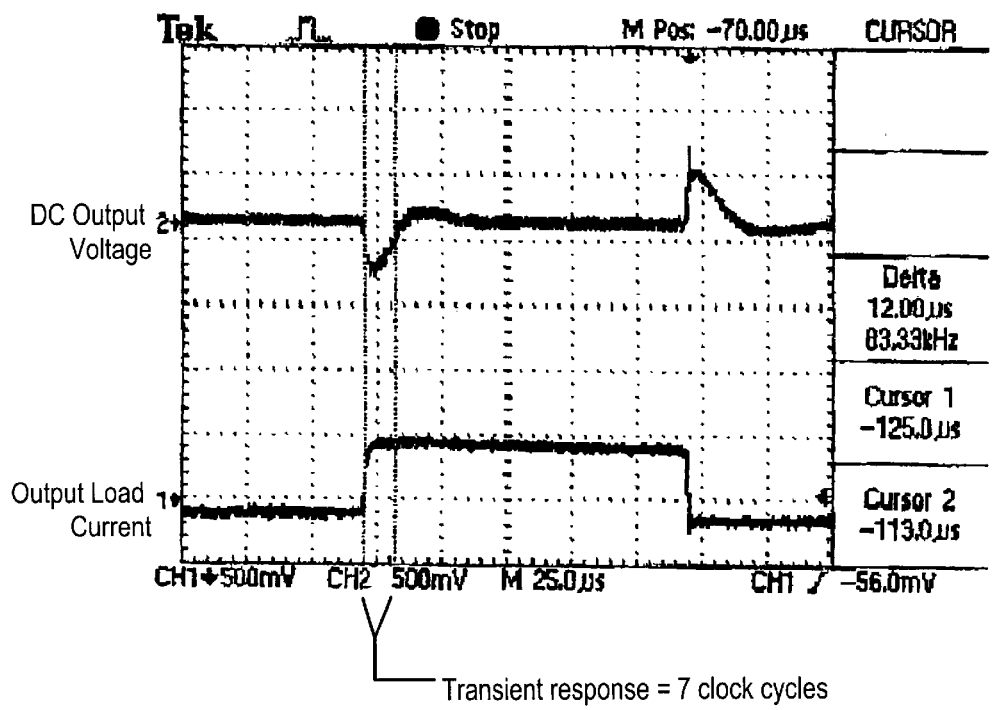
FIG. 10 shows a DC output voltage and output load current of the embodiment.

One embodiment of the operation of the circuit and method is shown in FIGS. 8–10.

Referring to FIG. 8, a block diagram of the details of the High Accuracy Digital Pulse Width Modulation Control circuit is shown. Control of the DC output 10 voltage starts by comparing a sample 12 of the output 10 voltage to the comparator reference 14 by the voltage comparator 16. The comparator reference 14 is a summation of the Voltage reference 18, the output of an Adjust Amplifier 20, and the output 22 of the ripple generator 24.

Referring to FIG. 9A, waveforms associated with this pulse 26 width modulation are shown. The pulse 26 starts when a clock generator 28 turns on a latch 30. This turns on Power switch Q1 through switch driver U1, and starts the flow of power through transformer T1, rectifier CR1, and output filter L1 and C1.

Referring again to FIG. 8, the comparator 16 changes state and turns off the latch 30 when the sampled DC output 12 becomes the same as the comparator 14 reference, which in turn shuts off transistor Q1. The process repeats when the clock generator 28 turns on the latch 30 again.

The pulse 26 width generated by the above circuit depends on the DC output 10. If the DC output 10 is too low, the comparator output 32 stays in a high state longer, thereby increasing the pulse width driving transistor switch, Q1, which increases the DC output 10. Conversely, if the DC output 10 is too high, the comparator output 32 stays high for a shorter period of time, decreasing the pulse width driving transistor switch Q1, thereby decreasing the DC output 10. The DC output 10 is thus regulated by the action of the voltage comparator 14.

As can be appreciated, there is a desired or precise DC output based upon the selection of the reference voltage. If the DC output 10 voltage is not precisely correct, the sample DC output voltage 12 is not exactly equal to the voltage reference output 18, and the output of adjust amplifier 20 senses the difference and adds a voltage offset 34 to the comparator reference 14 such that the DC output sample 12 becomes exactly equal to the output of the voltage reference 18. The comparator reference 14 voltage therefore continually adjusts so that the DC output 10 is precisely regulated.

As can be seen from the waveforms of FIG. 9A, during latch 30 output "on" time, the comparator reference 14 voltage ramps down until it touches the DC output sample voltage 12, at which point 38 latch output turns off and the comparator reference 14 voltage begins to ramp up.

A second scenario occurs as depicted in FIG. 9B. If the DC input voltage 40, or the load output 10 current changes such that a much smaller pulse width is needed to maintain output 10 voltage regulation, the ramp-down portion of the comparator reference 14 becomes smaller, and the ramp-up portion becomes larger. This forces the trough of the comparator reference 14 voltage to rise, thereby causing the DC output 10 voltage to increase.

Without the adjust amplifier 20, the result is the increase in DC output 10 voltage which translates to poor regulation of output voltage 10. The introduction of adjust amplifier 20 by the instant invention changes the above scenario in that amplifier 20 senses this difference and adds voltage offset 34 to the comparator reference 14 so as to compensate for the above mentioned difference. Therefore, DC output 10 voltage goes back to being accurately regulated as depicted in FIG. 9B.

Likewise, if a larger pulse width is needed due to a change in DC Input 40 voltage or output 10 load current, the ramp-down portion of the comparator reference output 32 becomes larger, while the ramp-up portion becomes smaller (as shown in FIG. 9C). This causes the DC output 10 voltage to drop. The adjust amplifier 20, again, senses this difference and adds voltage offset 34 to the comparator reference 14 so as to compensate for this difference. The DC output 10 voltage is again restored to being accurately regulated as depicted in FIG. 9C.

FIG. 10 shows a typical response of the DC output 10 voltage utilizing the High Accuracy Digital control circuit and method of the instant invention to a change in DC output 10 load current. As the DC output 10 load current steps from one value to a higher value, the DC output 10 voltage drops. The comparator 16 corrects for this drop in a similar fashion as that of the prior art devices. However, the instant invention introduced adjust amplifier 20 which significantly improves DC output properties in that small deviation from the desired output is quickly corrected. In other words, because of the action of the adjust amplifier 20, the DC output 10 voltage is fully restored to its original value.

Figure 7:
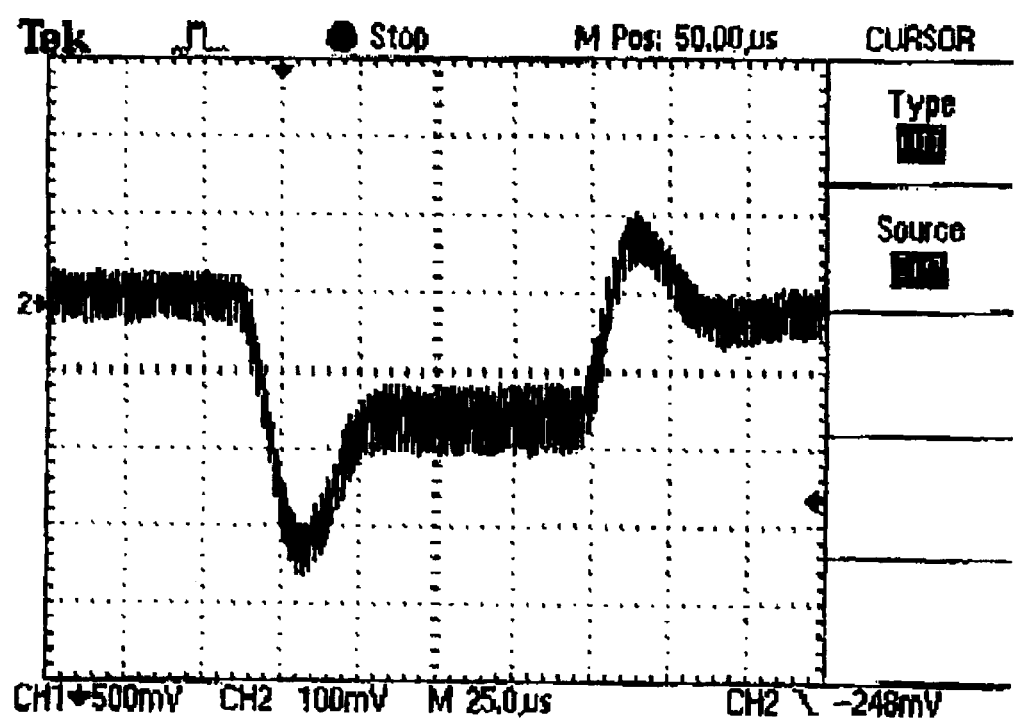
FIG. 7 shows a prior art graph depicting a prior art digital PWM output voltage change due to a step change in output load current.

A comparison of FIG. 7 (prior art Conventional Digital Control) and FIG. 10 (High Accuracy Digital Control) illustrates this difference. As can be appreciated, in FIG. 10, the speed with which the DC output 10 voltage corrects (i.e. the transient response) is approximately 7 clock cycles, which is just as fast as the Conventional Digital Control method but the output voltage is fully restored, whereas the prior art conventional digital control method only partially restores the output voltage. In other words, the instant invention can achieve the speed comparable to prior art digital control method, however, the accuracy of the instant invention is far more accurate or higher than the prior art digital method.

As can be appreciated by virtue of previous discussions, this pulse width modulation control needs to be stable. In other words, the AC ripple component must be at the same frequency as the clock generator. In order for this to occur, for a fixed DC input voltage and a fixed DC output 10 load current, the pulse width that drives power switch Q1 must not change from pulse to pulse,. This is shown in FIG. 9A as the same pulse width among the three pulses shown.

In the previous discussion of the prior art conventional digital control method, we have shown that in order for the DC output 10 to stay stable, the ripple component of the DC output sample must firstly be high, and second the ripple amplitude must be accurately controlled. We have also shown that controlling the amplitude of the ripple is difficult because it is a function of a parameter of capacitor C1, which varies widely from unit to unit, thereby causing difficulty in maintaining a stable DC output 10 in a production environment.

The instant invention incorporating the new High Accuracy Digital control method gets around both problems of high DC output 10 ripple and unit-to-unit ripple amplitude accuracy, by the injection of a highly accurate ripple into one leg of the comparator 16. The Ripple Generator 24 creates this ripple either from the clock generator, or from monitoring the current through inductor L1.

The ripple can be injected into (or overlaid onto) either leg of the comparator 16 as long as it is of proper polarity. FIG. 9A shows the ripple to have a downward slope during the pulse "on" time, so it is injected into the Comparator reference 14 leg. Likewise, a ripple with an upward slope during the pulse "on" time can be injected into the DC output sample 12 leg of the comparator 16 (not shown).

The way in which the latch 30 output is turned on and off can be reversed without impacting the basic operating concept of the high accuracy digital pulse width modulation control circuit and method. FIG. 9A shows that the latch output is turned on by the clock generator, and turned off when the comparator reference 14 comes down and touches the sample DC output 12. This is called trailing edge modulation since the clock generator always turns on the leading edge of the latch output, while the trailing edge adjusts so as to regulate the DC output 10.

Likewise, leading edge modulation can be implemented by turning on the latch when the comparator reference 14 rises up and touches the sample DC output 12. The clock generator 28 is then used to turn off the latch 30. The leading edge of the clock output, therefore, adjusts so as to maintain DC output 10 regulation, while the clock generator always turns off the trailing edge. Pertinent waveforms of trailing edge modulation are shown in FIG. 9D.

Figure 1:
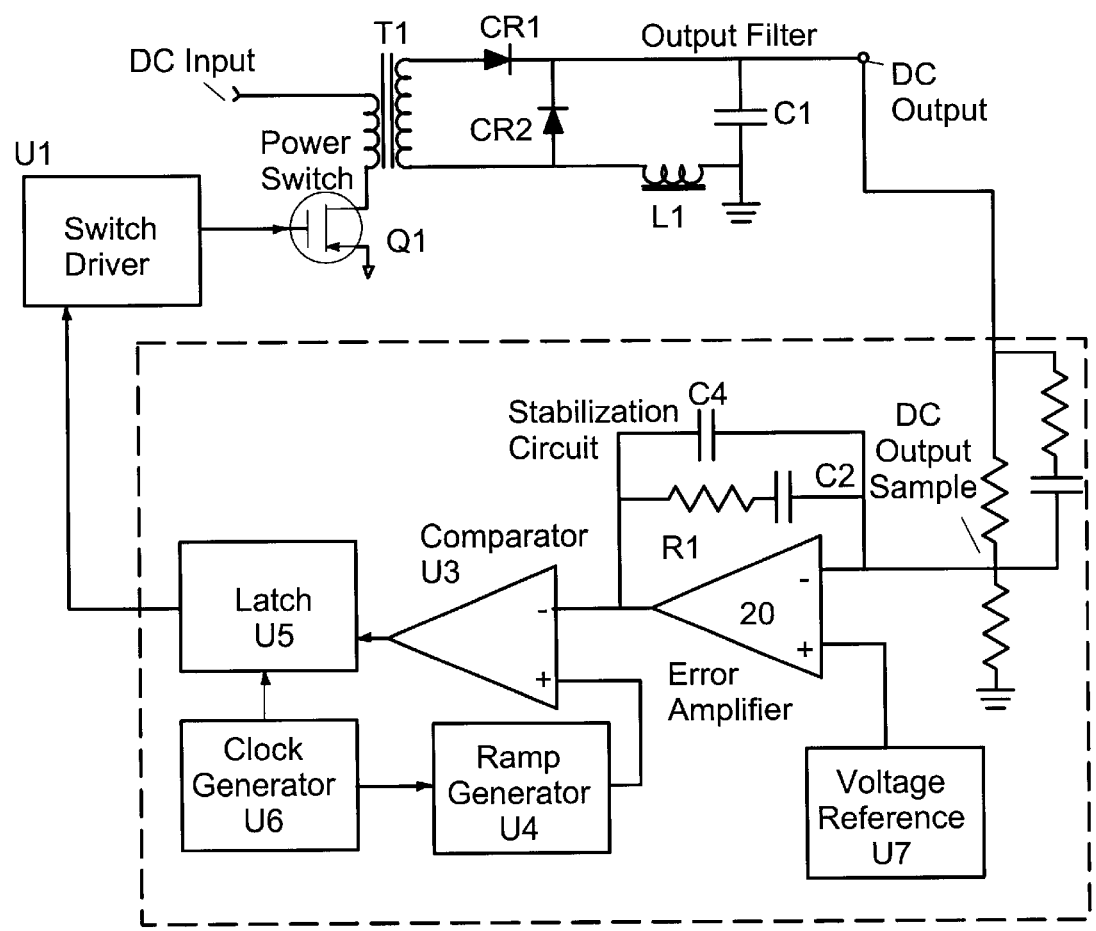
FIG. 1 shows a circuit depicting a prior art analog pulse width modulation control of a DC/DC converter.
Figure 2:
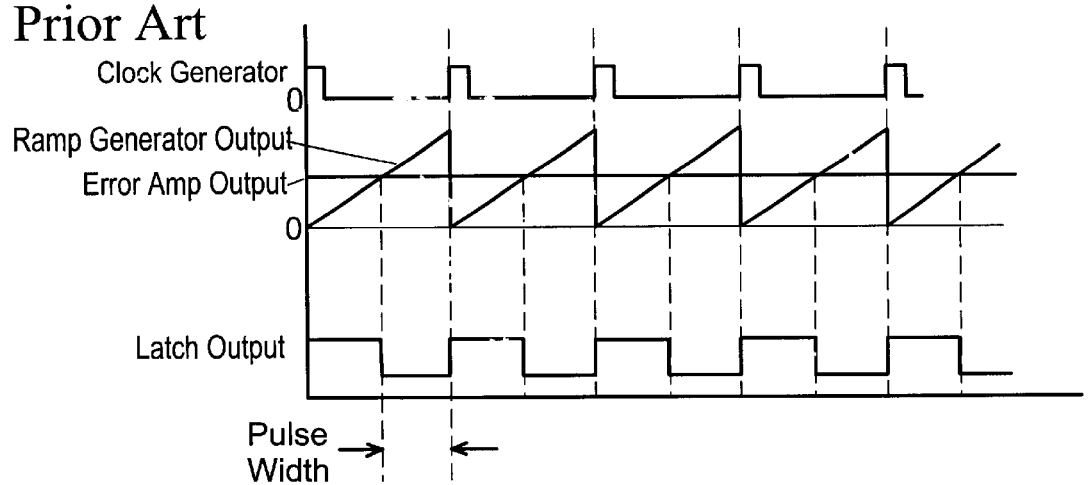
FIG. 2 shows a set of prior art analog pulse width modulator control waveforms of FIG. 1.
Figure 3A:
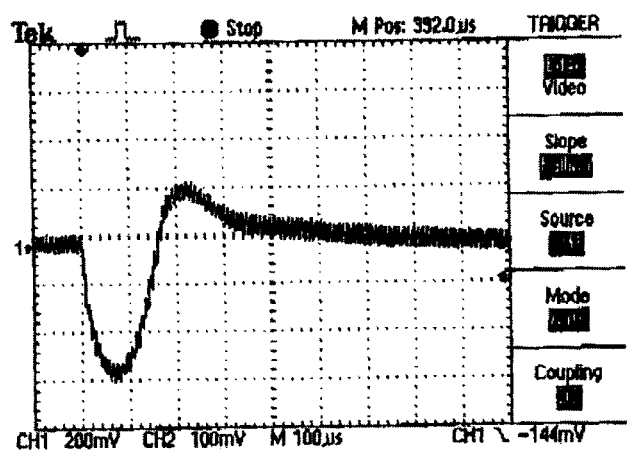
FIG. 3A shows a prior art DC output voltage change due to a change in output load current (from low to high) in a prior art analog pulse width modulation control method.
Figure 3B:
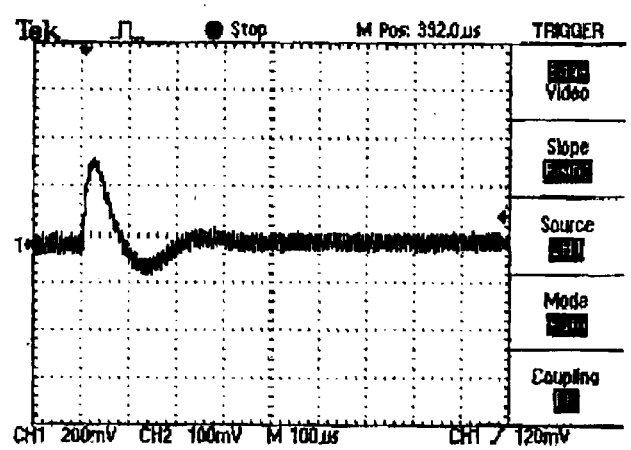
FIG. 3B shows a prior art DC output voltage change due to a change in output load current (from high to low) in a prior art analog pulse width modulation control method.
Figure 4:
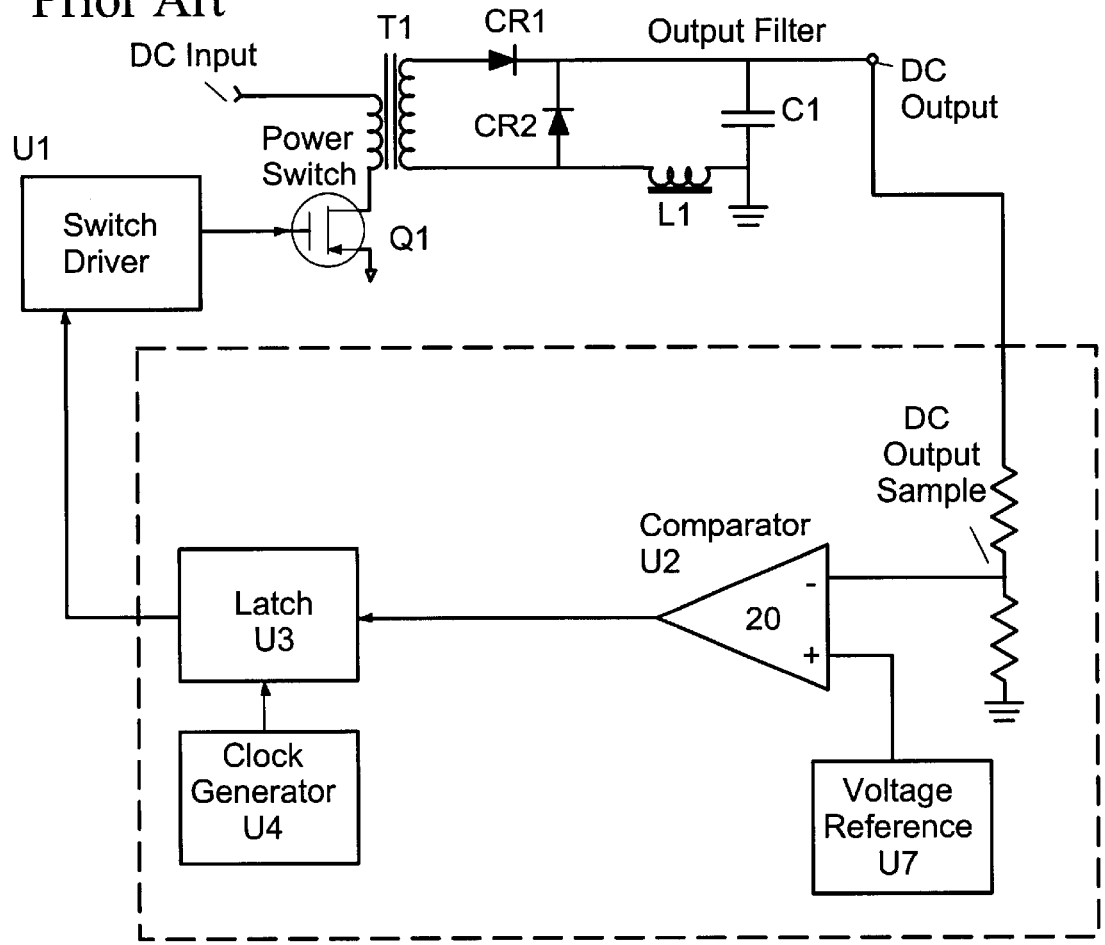
FIG. 4 shows a circuit depicting a prior art digital pulse width modulator control of a DC/DC converter.
Figure 5:
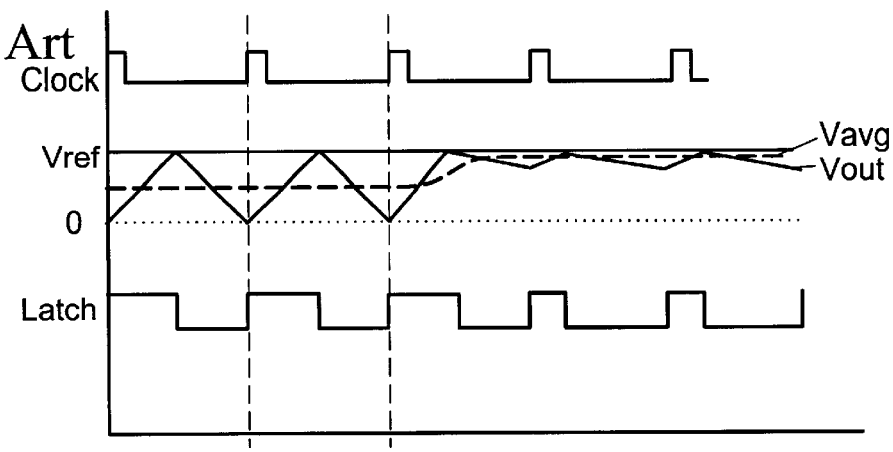
FIG. 5 shows a set of prior art digital pulse width modulator control waveforms of FIG. 4.
Figure 6A:
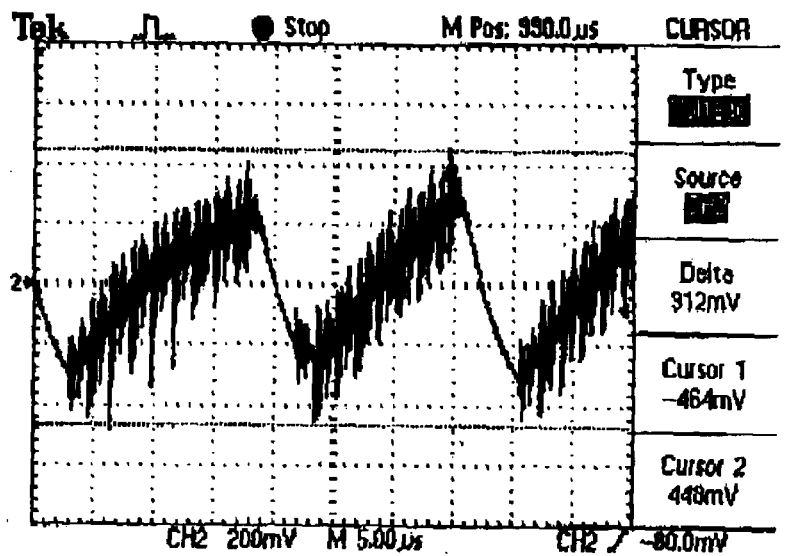
FIG. 6A shows prior art digital control wave forms having low frequency instability manifested in DC output ripple due to missing pulses.
Figure 6B:
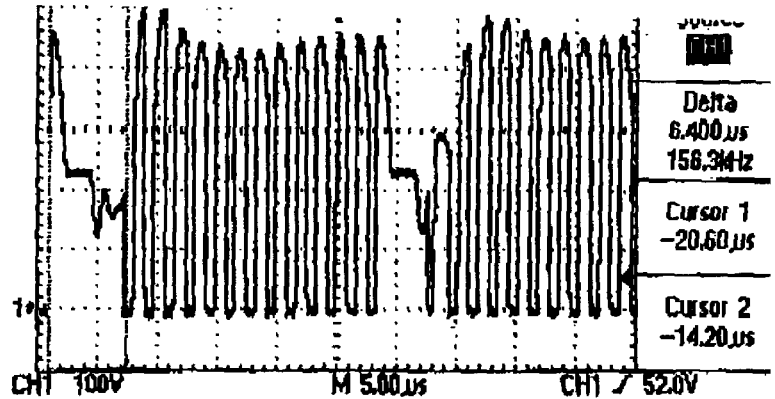
FIG. 6B shows prior art digital control wave forms having low frequency instability manifested in power switch waveforms having missing pulses.

The circuit and method or the instant invention operate in a manner similar to the conventional digital pulse width modulation, where a voltage comparator such as the U2 in FIG. 4 compares a sample of the DC output to a reference in order to generate a pulse width from latch U4, which regulates the DC output voltage. The transient response of this method is therefore as fast as the conventional digital control method. I.e. 5 to 10 clock cycles.

The difference of the instant invention with the prior art digital pulse width modulation is twofold. First, a ripple generator 24 is added. This circuit injects or overlays a precise ripple of the correct polarity into one leg of comparator 16 so as to maintain stability of the DC output 10. This allows the DC output 10 to have a low ripple component, thus preventing the DC output 10 from becoming unstable because of parameter variations of capacitor C1.

Secondly, a high gain amplifier 20 is added. This "adjust" amplifier 20 compares the voltage reference 18 to the sample DC output 12 voltage. Any difference between the two is amplified and used to correct the comparator reference 14 used by comparator 16 to control the DC output 10 voltage. The DC output 10 voltage is thus accurately controlled. This control is similar in accuracy as that obtained with the prior art analog control method albeit with significantly faster response time as shown in FIG. 10.

This new high accuracy digital control circuit and method, therefore, provide the accuracy and stability of the conventional analog control method, and at same time maintain the speed of the conventional digital control method.

In many applications, electric isolation is required. For example, most DC/DC converters, which operate from a high voltage DC Input (greater than 150 v), require electrical isolation from input to output. For simplicity, the block diagram of FIG. 8 does not show any electrical isolation between the DC output, and the DC Input. But those skilled in the art should know how to incorporate electrical isolation into a DC/DC Converter. A number of standard methods exist, which are not usually related to the type of pulse width modulation method employed.

Figure 11:
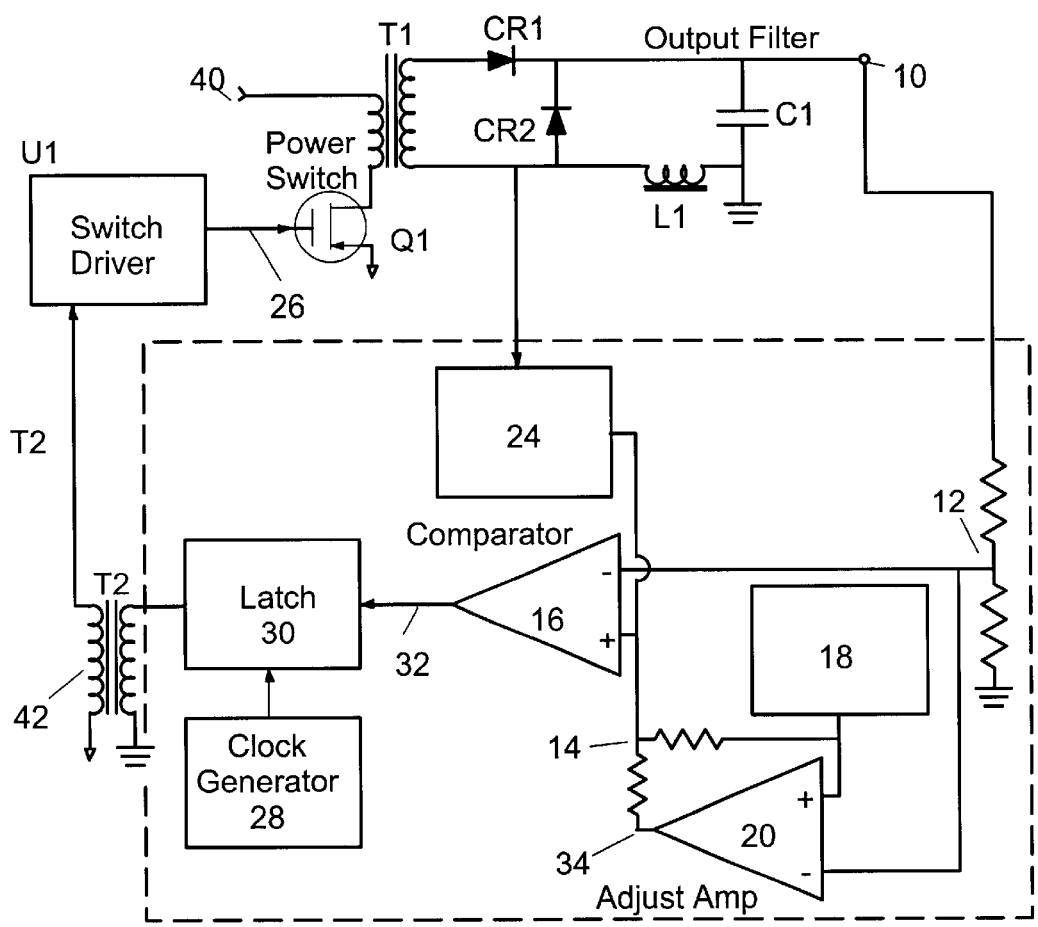
FIG. 11 shows a first alternative embodiment of the present invention.
Figure 12:
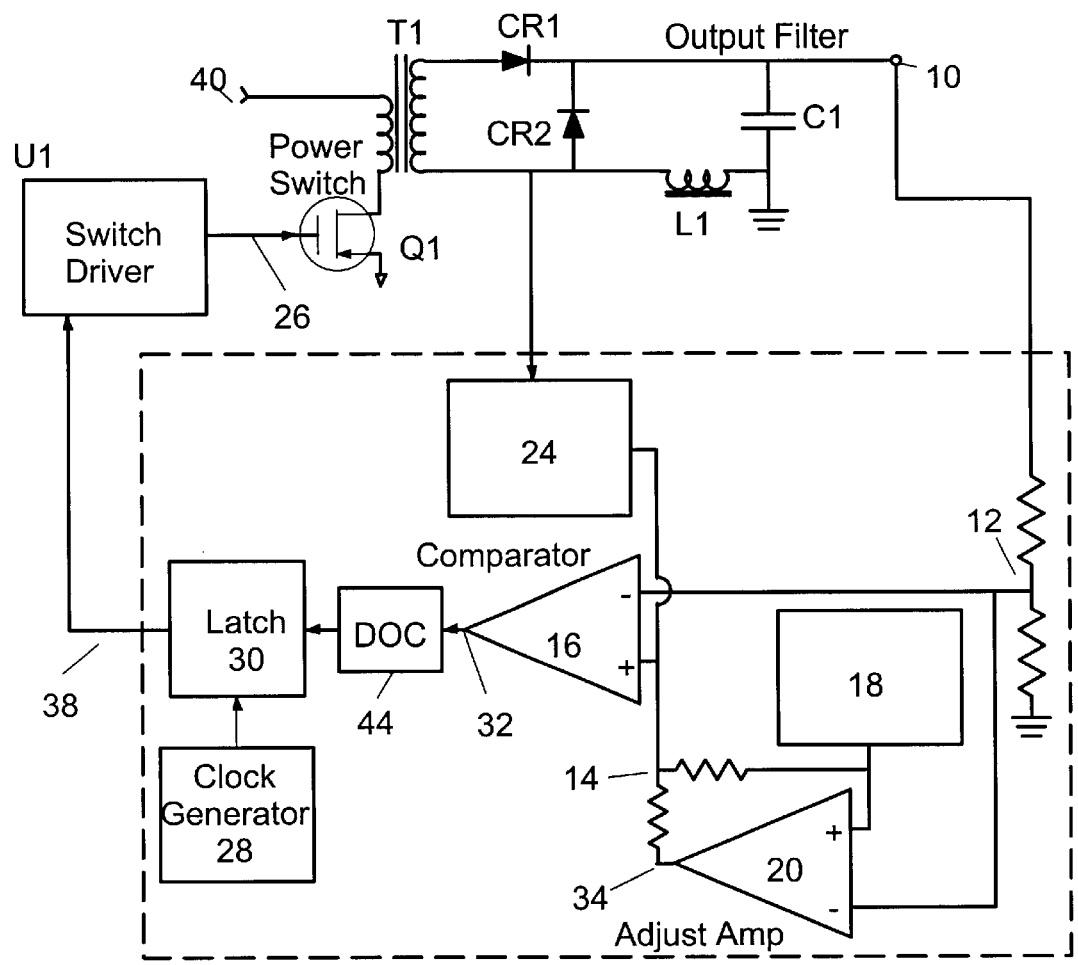
FIG. 12 shows a second alternative embodiment of the present invention.

FIGS. 11 and 12 depict Electrically Isolated DC/DC Converters. Referring to FIG. 11, one of these methods incorporated into the high accuracy digital pulse width modulator control circuit is shown. Latch 30 output, is shown going through driver transformer 42 prior to connecting to switch driver U1.

FIG. 12 shows an alternative circuit and method for achieving electrical isolation. The output 32 of comparator 16 goes through a digital optical coupler, 44 prior to connecting to latch, 30. In this approach, latch 30 and clock generator 28 are referenced to the DC Input side of the DC/DC converter, while the rest of the control circuit are referenced to the DC output side of the DC/DC converter. In other words, digital optical coupler electrically isolates components into two parts where the first part being at one side of optical coupler 44 is electrically isolated from the other part which is at the other side of optical coupler 44.

Other isolation methods, which place different circuit blocks on different sides of the isolation barrier, are also contemplated by the instant invention. The key is to electrically isolate the feedback loop from the DC output to the DC input via the PWM control circuit.

The present invention further contemplates circuit and method incorporating DC/DC Converters with multiple outputs. For the sake of clarity, the block diagram of the high accuracy digital DC/DC converter circuit and method of FIG. 8 merely show a single DC output. This circuit and method can, however, be extended to multiple output DC/DC converters, with each output being independently regulated.

Those skilled in the art should know that there are a number of standard circuits and methods for achieving multiple outputs from a single DC/DC converter. These methods are not generally related to the type of pulse width modulation employed in the instant invention.

Figure 13:
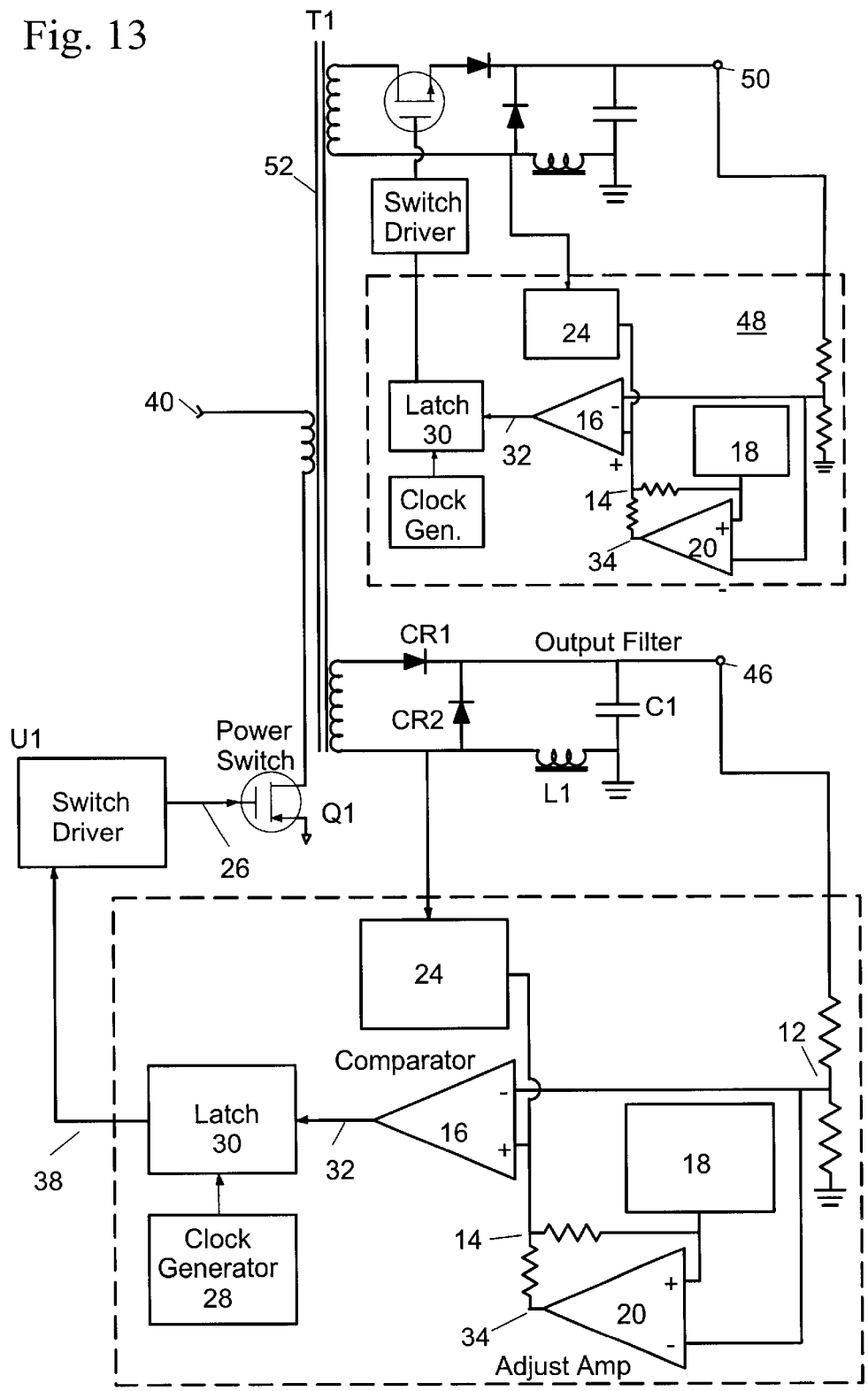
FIG. 13 shows a third alternative embodiment of the present invention.
Figure 14:
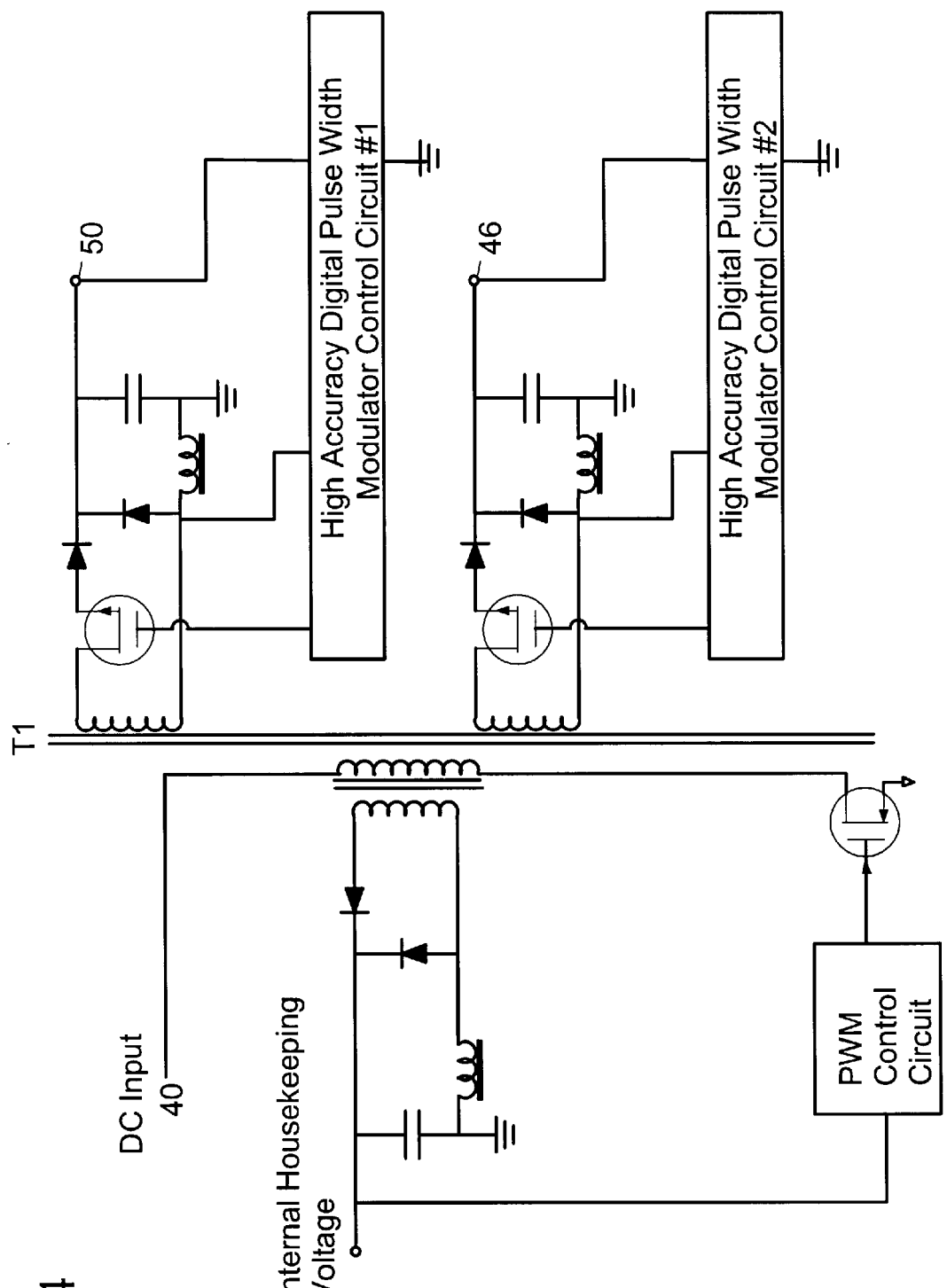
FIG. 14 shows a fourth alternative embodiment of the present invention.

FIGS. 13 and 14 merely show two of the above mentioned multiple outputs embodiments. Referring to FIG. 13, one of these circuits and methods, which incorporates the high accuracy digital pulse width modulator control circuit for each of the outputs, is shown. First output 46 is controlled as depicted in FIGS. 8–12, with the control circuit modulating power switch Q1 as shown. A separate high accuracy digital pulse width modulator control circuit 48 regulates a second output 50, which operates on a second winding 52 of transformer T1, by pulse width modulating power switch Q2. The control circuit 48 does not need electrical isolation since transformer T1 already provides this. The clock generator of second output 50 is synchronized to the clock generator of first output 46 via transformer T1. This circuit or method can be extended to any number of outputs.

One disadvantage of the method mentioned in the previous paragraph is that first output 46 needs to have a minimum load current in order for the second output 50 to regulate properly. In other words, power switch Q1 needs to be "on" in order for circuit 48 to control second output 50. This disadvantage can be easily cured. For example, in FIG. 14, an alternate method for achieving multiple outputs is shown. In this alternative method, power switch Q1 is not used to directly regulate one of the outputs. Instead, an internal DC voltage 54, which is electrically referenced to the DC Input 40 side of the DC/DC converter, is provided. This voltage 54 is generally used to operate the DC input referenced control circuits. Since this internal voltage 54 does not require high speed or high accuracy, any pulse width modulation control method is acceptable. In other words, PWM control circuit 56 may use any pulse width modulation control method.

The multiple outputs are separately regulated through individual windings of transformer T1, by individual high accuracy digital control circuits pulse width modulating power switches Q2 and Q3 respectively. Clock generators for each output are synchronized via the winding of transformer T1. Alternatively, if all outputs share a common return, a single clock generator can be shared among the outputs. This method has the advantage of not requiring any output to be loaded in order to achieve regulation. It can be extended to any number of outputs.

So far the invention is described in the form of analog and digital building blocks. Analog signals are the inputs, and a pulse width modulated signal is the output. However, the instant invention can also be implemented by using a digital signal processor. The digital signal processor digitizes the analog inputs, and performs mathematical calculations on the numbers related to these analog inputs. The mathematical calculations perform the same functions as the blocks described in this application. The numbers are then converted back by the digital signal processor to a pulse width which is used to control the DC/DC converter.

Figure 15:
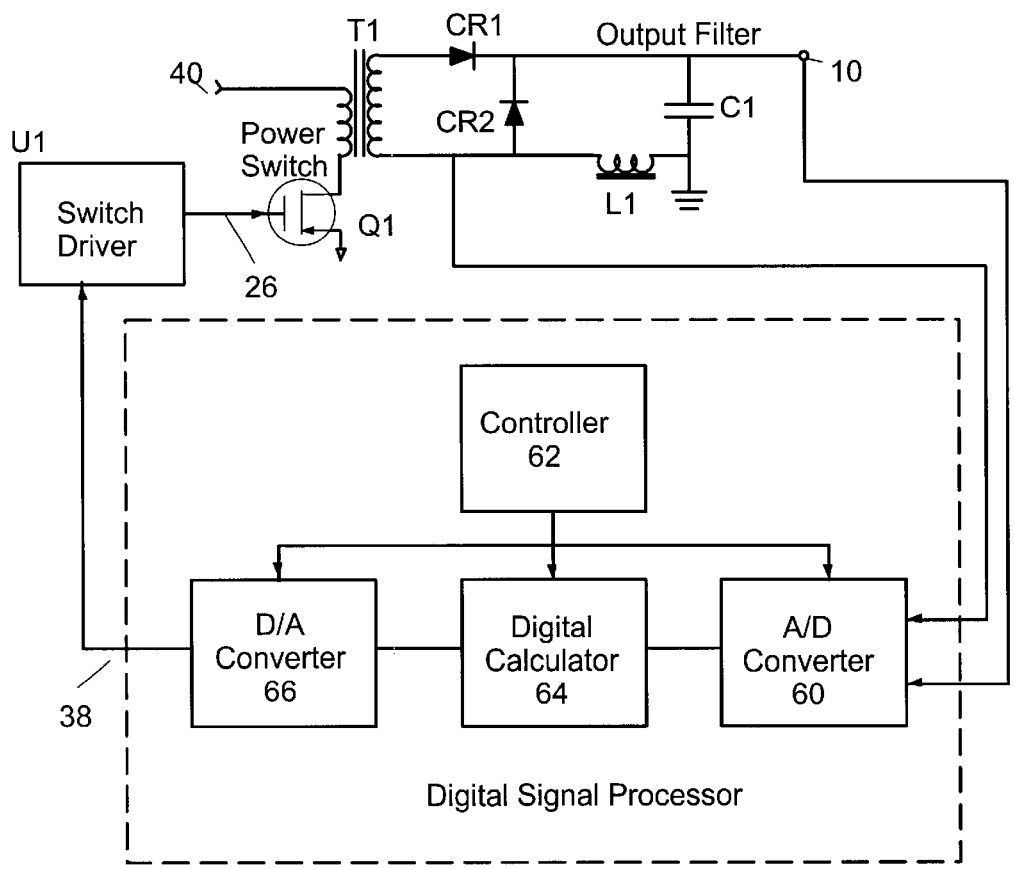
FIG. 15 shows a block diagram of the instant invention.

Referring to FIG. 15, a block diagram depicting a usage of the digital signal processor is shown. A/D converter 60 under the controller of controller 62 converts analog signals into digital signals. The converted digital signals are then used for calculations by calculator 64. The calculated results, in turn, are converted back to analog signals by D/A converter 66. calculator 64 and D/A converter are respectively controlled by controller 62.

By example, a program product, which simulates adjust amplifier 20, can acts as calculator 64 and calculate the difference between a reference number (voltage reference 18) and the DC sample number (calculated from the analog to digital conversion of the DC output voltage). The difference is multiplied by a large number (amplified) and used to add an adjustment to the comparator reference number, which is used by a comparator software routine.

Up to this point, the instant invention is used for DC output control. However the instant invention can be used for the control of processes where traditional feedback loop techniques are employed. The invention provides both fast transient response and high accuracy. The traditional feedback loop techniques contemplated by the instant invention include speed control of electric motors, servo motor control of position, and generation of AC waveforms from a DC input.

One embodiment of the invention may be implemented as a program product for use with a computer system. The program(s) of the program product defines functions of the embodiments (including the methods described below with reference to FIG. 15 and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A digital pulse width modulator (PWM) control circuit, comprising:
   a) a first input being a sample of a DC output;
   b) a second input being coupled to the DC output and possessing a ripple signal in synchronization with a DC output component;
   c) a voltage reference for determining a desired DC output;
   d) an adjustment amplifier having a portion of the DC output and the voltage reference as inputs, thereby amplifying a first difference; and
   e) a comparator having the first input and the output of the adjustment amplifier as inputs thereto with the second input overlaying one of the comparator inputs, the comparator comparing a second difference;
      thereby a determination is made as to whether the DC output is above or below the desired DC output and a correction is performed to change the DC output to a set of values as close to the desired DC output as possible.

2. The circuit of claim 1 further comprising a power switch coupled to the output of the comparator, thereby the power switch switches a DC input on and off according to a PWM scheme for achieving the desired DC output.

3. The circuit of claim 1, wherein the DC output component is an output winding of a transformer.

4. The circuit of claim 1, wherein the DC output component includes an inductance.

5. The circuit of claim 1, wherein the first difference is a difference between the portion of the DC output and the voltage reference.

6. The circuit of claim 1, wherein the second difference is a difference between the first input and the output of the adjustment amplifier.

7. A DC/DC converting system, comprising:
   a) a DC input power source disposed to be switched on and off periodically by a first power switch;
   b) at least one DC output receiving power from the DC input power source;
   c) at least one digital pulse width modulator (PWM) control circuit coupled to the DC output, the circuit including:
      i) a first input being a sample of the DC output;
      ii) a second input being coupled to the DC output and possessing a ripple signal in synchronization with a DC output component;
      iii) a voltage reference for determining a desired DC output;

iv) an adjustment amplifier having a portion of the DC output and the voltage reference as inputs, thereby amplifying a first difference; and v) a comparator having the first input and the output of the adjustment amplifier as inputs thereto with the second input overlaying one of the comparator inputs, the comparator comparing a second difference;

thereby a determination is made as to whether the DC output is above or below the desired DC output and a correction is performed to change the DC output to a set of values as close to the desired DC output as possible.

8. The system of claim 7, wherein the digital pulse width modulator (PWM) control circuit further comprising a power switch coupled to the output of the comparator, thereby the power switch switches a DC input on and off according to a PWM scheme for achieving the desired DC output.

9. The system of claim 7, wherein the power switch is the first power switch.

10. The system of claim 7, wherein the DC output component is an output winding of a transformer.

11. The system of claim 7, wherein the DC output component is an inductor wherein the input power source and the at least one output receiving power are electrically isolated within the digital pulse width modulator control circuit by an isolation device.

12. The system of claim 7, wherein the isolation device is an optical isolation device.

13. The system of claim 7, wherein the isolation device is a magnetic isolation device.

14. The system of claim 7, wherein the first difference is a difference between the portion of the DC output and the voltage reference.

15. The system of claim 7, wherein the second difference is a difference between the first input and the output of the adjustment amplifier.

16. A method for controlling a DC/DC converter, comprising the steps of:

a) providing a switchable DC input to generate at least one DC output;

b) providing a voltage reference;

c) amplifying a first difference between a portion of the DC output and the voltage reference; and d) comparing a second difference between a portion of the DC output and the amplified first difference;

e) overlaying a ripple signal upon either the amplified first difference or the portion of the DC output.

17. The method of claim 16 further comprising providing a in which the ripple signal originates from the DC output.

* * * * *